Sept. 22, 1925.
E. T. FERNGREN
1,554,269
SHEET GLASS APPARATUS
Filed Dec. 26, 1924
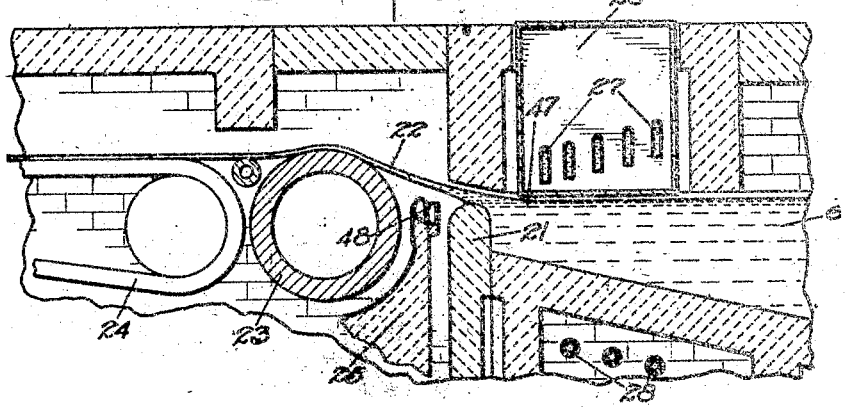
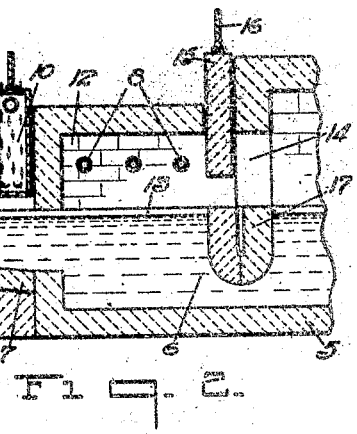
INVENTOR.
Enoch T. Ferngren.
Frank Fraser
ATTORNEY.

Patented Sept. 22, 1925.

1,554,269

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS APPARATUS.

Application filed December 26, 1924. Serial No. 758,134.

*To all whom it may concern:*

Be it known that I, ENOCH T. FERNGREN, a citizen of the United States, residing at Toledo, in the county of Lucas and State of Ohio, have invented new and useful Improvements in Sheet-Glass Apparatus, of which the following is a specification.

The present invention relates to a method and apparatus for producing sheet glass, and has particular reference to an apparatus wherein a sheet of flat glass is continuously drawn from a source of molten glass.

An important object of the invention is to provide a method and apparatus for continuously drawing a sheet from a source of molten glass and includes means whereby the source of glass is treated in a manner that a smooth flat high grade sheet of glass can readily be drawn, and thus the purpose of the invention is to provide a process treatment of the glass of a supply body from which sheet glass is being produced, to thereby unify the body structure of a portion of the top layer of the glass, and establish a like viscosity condition therein to an equal depth over an equally wide area thereof, and in particular to facilitate or retard the movement of the glass of the supply, which is in the path of draw, at the locality where it leaves the supply or is deflected therefrom to enter the sheet formation in a precise and equal fashion at all points adjacent the base of the sheet being drawn to the end that an equally tensioned sheet may be produced, which in marketable form would be almost equal to a ground and polished plate.

Another object of the invention is to provide a method and apparatus for producing sheet glass wherein the surface of a pool of molten glass is successively and alternately heated and cooled to form a relatively semi-solid skin upon the pool, said skin being adapted to be withdrawn therefrom in sheet form.

A still further object of the invention is to provide a method and apparatus for producing sheet glass wherein the surface of a pool of molten glass is alternately heated and cooled to bring about a molecular change in such glass whereby a homogeneous and more desirable surface of glass is created, which, due to the action of the cooling means, is transformed into a semi-solid layer or skin which may be drawn or slid from the fluid glass underneath in sheet form.

Another object of this invention is to draw a sheet of glass from a surface stratum treated in the above manner or from a surface layer made plastic by indirect cooling through a metallic body which in practice is placed close to the glass, while the movement of the surface in the direction of draw is unified and controlled by a suitably driven drum or roll depressed into the surface glass, by which a uniform resistance to tractive force is imparted to the entire front of the surface layer or stratum and the cohesiveness of this glass uniformly increased to an equal depth.

A further object of the invention is to expose the glass sheet which is drawn from the supplying glass under the above condition to released and radiant heat delivered against the same from two directions to insure conformation pliancy of sheet during subsequent bending or handling.

Other objects and advantages of the invention will become apparent during the course of the following description.

Fig. 1 is a fragmentary longitudinal vertical section through a portion of one form of apparatus, Fig. 2 is a similar view through a slightly modified construction, and Fig. 3 is another view of still another form.

This invention is distinguished from the prior art in that the surface of a pool of glass is alternately heated and cooled to produce a layer or sheet of semi-solid glass upon the pool which may be termed a skin, which skin can be easily removed from the pool because of the fact that the under-fluid glass will act as a lubricant, thus facilitating the removal of said skin. By the alternate heating and cooling the condition of the glass which is being drawn into sheet form is greatly improved. It is old in the prior art to heat a body of glass slightly above the temperature desired and reduce this temperature by heat-absorbing means, but this invention differs from this prior art usage in that the glass is heated, cooled and reheated and cooled again as many times as desired. In other words the surface of the pool is successively and alternately heated and cooled to produce a semi-solid skin upon a mass of molten glass.

When a quantity of molten glass is cooled it is assumed that a molecular change takes place and that the constituents of the glass become more nearly related to each other, and when this glass is again reheated the molecules will be permitted to arrange themselves more regularly and possibly move slightly but will not return to their original relationship. Upon cooling the glass a second time there is a still more regular grouping and closer knitting together of the molecules, thus producing a more homogeneous mass of glass than has heretofore been produced.

This construction can very well be adapted to many of the forms of machines now in use.

In the drawings the numeral 5 designates a tank furnace in which the glass batch is melted and treated, and may be if desired passed through a refining chamber. After the glass source 6 has been properly refined it is permitted to pass through the cooling and heating chamber 7 to properly condition the same for the purpose of being drawn into a sheet. Arranged above the source of glass 6 are groups of heating elements 8 and 9 respectively and groups of cooling elements 10 and 11 respectively. The heating elements designated by the numerals 8 may be in the form of gas burners and are contained in the side walls of the chamber 12 in a manner that heat may be obtained by the combustion of a gaseous atmosphere in chamber 12 and applied to the surface of the source 6 as at 13. One end of the chamber 12, which is open as at 14 is controlled by means of the shear-cake 15 which is adjustably supported by the means 16. A floater or some form of retaining wall 17 may be submerged in the glass 6 to dam off direct surface currents of glass from the melting zone and arrest scum or other surface foreign matter.

As the glass source 6 advances toward the drawing end 18 of the arrangement it passes under and is exposed to the action of the heating elements 8, whereby the temperature of the glass is greatly increased. After the glass has thus been treated it passes under the influence of the adjustable metallic box cooler 10 which is of a substantial construction and may be internally cooled by means of a suitable fluid or air. When elevated, as shown in Fig. 2, the cooler will absorb less heat from the glass.

The cooling action will cause the upper surface of the molten glass 6 to become more plastic than the underglass, and at the same time will cause a molecular change as has already been pointed out. The glass is then in its movement toward the end 18 of the apparatus subjected to the action of heater 9 contained in the chamber 19, thus reheating the surface glass after which a cooler 11 receives in the pocket or chamber 20 will again cool the surface glass to create a layer or sheet of semi-solid glass which may be termed a fire-polished ductile skin on the surface of the pool 6. As is shown in Fig. 2 the glass is then in a condition to be drawn in sheet form.

It is to be understood that the glass may thus be treated by alternate heating and cooling as many times as desired, and also the intensity of the heating or cooling can be regulated to control the thickness of skin formed on the pool, thus determining to a certain extent the type of glass formed and the degrees of tractability therein from the surface downward.

In Fig. 1 the glass is drawn substantially laterally from the pool 6 over a vertical adjustable gate slab 21. The sheet 22 is drawn from the pool and is passed over a rotatable roll or drum 23 and upon a flattening table or other form of conveyor 24. A cooler or heater 25 is disposed between the roll 23 and the vertical member 21 of the pot, thus assisting conditioning the sheet after it has left its source. In the construction shown in Fig. 1, the vertically adjustable cooler 26 preferably comprises a box like structure having walls of a suitable metal in which is disposed a plurality of conduits 27 through which any form of effective cooling medium may also be passed. Arranged beneath the end of the furnace are a plurality of burners 28 to assist in keeping the underglass fluid.

In Fig. 2 the sheet 29 is drawn from the source 6 preferably at an angle, and is engaged at its edges by the rolls 30. The sheet is then deflected into a horizontal plane over a longitudinal adjustable roll or drum 31 and is then passed over idler roll 32 and conveyor 33. The sheet is subjected to a gas flame 34 after it has been drawn from the pot, thus giving it a fire finish, and also to assist the same when being bent over the drum 31. The drum 31 may be kept cool by means of a blast of air being passed through the member 35 having the curved lip 36 arranged beneath the said roll. The pot is heated under its bottom by means of gas flames 37 passing through the port 38 into the compartment 39 formed below said pot. The heat thus introduced under the pot is permitted to pass up between the end of the pot 18 and the wall 40 where it is deflected by means of the baffle plate 41 downwardly upon the surface of the glass in said pot, and is also projected against the meniscus at the point where the fluent glass joins the same, thus preventing chilling at this side of the meniscus.

In Fig. 3 the surface of the glass is treated by the alternate heating and cooling to create a floating unit of plastic glass upon the molten glass beneath, after which the forward end of the unit is contact chilled and withdrawn from the pot in sheet form. A rotatable preferably vertically adjustable roll or drum 42, which is air or water cooled, is arranged at the sheet supplying meniscus as is shown, and is preferably resiliently seated upon the upper surface to prevent buckling or other irregular movement of the surface skin as it is being drawn from the pot. The sheet 29 is then deflected over the bending roll 43 as in the construction shown in Fig. 2. The series of gas flames 44 are played through a series of ports formed in the hood 45, and radiant heat is reflected upon the upper surface of the sheet in its substantially vertical draw, while the opposite side of the sheet formation is exposed to radiant heat energy from the glass body in the end 18 of the pot and the heat arising from the chamber 39.
The roll or drum 42 is of particular importance in the uniform conditioning of the glass at the point of lift of the sheet which makes it possible to draw a very flat sheet.

The roll 42 also determines by the speed given thereto the quantity advance of the supplying glass into the line of draw, so that it is now possible to considerably increase the speed of draw of any given thickness of sheet.
In the drawing the sheet from the forward end of the floating plastic unit at the point where the drum 42 contacts, this drum or roll becomes a barrier against which the glass is raised by the drawing force and to which it will adhere as it is surface chilled. As the drum 42 is slowly or speedily rotated in the direction of draw, this chilled surface of the plastic layer unit on the body of glass is released and progressively advanced to form the upper side of the sheet drawn. As the glass which comprises the sheet comes under drawing stress and is drawn taut, all stresses and tensions are localized in this surface of the sheet, as the supplementally heated more fluent glass which is picked up at the point of deflection and at the heated side of the meniscus is lacking in rigid properties. This condition is largely responsible for the absence of conflicting strain in the sheet during its forming period.

The peripheral speed given to the drum 42 will largely determine the speed at which the quantity of glass forming the supplying source of the sheet is advanced, and the speed at which this glass is drawn will determine the thickness of the sheet.

The radiant heat released against the glass sheet body tends to soften it and retain enough pliancy therein to insure easy bending over the roll 43.

The particular similarity feature of all of the cooling means shown for treating the surface of the sheet supplying glass is this, that instead of the commonly used thin-walled water coolers which ordinarily chill a small portion of the surface of the glass very quickly, the coolers shown function less drastically, and in a more mild manner over a larger area of the surface of the glass from which the heat is absorbed gradually.

Each of the several modes of coolers shown are box shaped, and of a size to nearly fill the chamber in which it is placed to thereby form a large negative temperature or cold zone into which the heat of the glass will be impelled. The lower surface of the flat metal plate which forms the bottom of each cooler should preferably be located fairly close to the glass surface so as to exclude air currents from the space between it and the glass. This metal plate may be permitted to become heated up to a certain point, but should normally have a temperature much below that of the adjacent glass surface.

The cooler 46 shown in Fig. 3 is air cooled and may be formed of monel or other metal, as air cooling through almost any metal body imparts a uniform cooling effect to the surface of a pool of glass, copper being the best heat conductor but not exactly suitable to employ without contact with water because of its low softening point.

In forming wide plate glass the particular initial and subsequent steps of this process of imparting an equally fixed pliancy to the glass which is going into the sheet, will be useful in preventing warping and waving of the sheet body.

The roll 42 may be rotated in the direction of draw at a speed much below the drawing speed when a single strength sheet is being drawn, but in any case the roll 42 will largely fix or impress the same speed on the glass entering the base of the sheet.

The cooling of the glass by the roll 42 may be more or less according to the degree of internal or external cooling given to the roll and the cooling medium used.

In carrying out the process under the conditions shown in Fig. 1, the sheet 22 is lifted or raised over the upper edge of the member 21, the tautness and tenacious structure of the top stratum 45 of the glass enabling this procedure.

The top layers 47 formed under the influence of cooler 26 is normally more yielding and stretchable at its forward end, and also more firmly attached to the supplying glass body 6, so that while progressively yielding the sheet the resistance to the drawing force is great enough to prevent a speedy unit advance of the surface layer unit, for which reason a comparatively smaller area and quantity thereof and more of the subsurface glass will enter the sheet stretch 22 strung from the layer 47 to the drum 23. Under these conditions and the angle at which the sheet is lifted while being drawn, all tension and stress incidental to drawing is located in the upper surface of the drawn glass, while there is almost a total absence thereof in the more fluent subsurface glass, which in passing over or releasing from the upper edge of gate 21. The upper surface of gate 21 is lubricated by a slight flow of liquid glass carried forward by the tenacious surface layer, or which upper edge of gate in the common practice with the means shown may be occasionally flooded with a virgin glass solution by the simple expedient of first lowering and then raising the gate, thus insuring that no lines or markings will be formed in the lower surface of the glass from any glass being anchored to the upper edge surface of gate 21. To assist in the maintenance of correct temperature at this point a flame is projected toward the vicinity of the glass forming the under side of the immediate sheet source at and slightly above the upper edge of gate 21, from the multiple burner 48.

In carrying out the method under conditions marked in Fig. 2, a more tenacious semi-rigid condition exists at the point where the sheet is drawn and a more extensive anchorage of surface layer to the supplying glass body, the drag of which, in combination with the high fluency condition of glass at wall 18, predisposes the slant of the sheet at the point where it is drawn.

The process as carried out with the means illustrated in Fig. 3 briefly consists in about the same treatment of the glass with the addition of the more local contact chilling of glass surface by the roll 42, and the rolling forward of the glass surface into the line of draw.

With the apparatus herein discussed it is possible by alternate heating and cooling of the surface of the pool of molten glass to create a homogeneous and smooth semi-solid skin of glass which is adapted to be removed from the pot in sheet form. The skin thus formed on the surface of the pool being relatively more plastic and of a greater viscosity can readily be removed without injury as the lower under-fluid glass will act as a lubricant and will assist in the sliding off or the withdrawing of the said skin.

The successively alternate heating and cooling of the surface of the pool can be accomplished in various ways, and may include those forms shown in the drawings, or if it is desired other forms of heating and cooling means can be utilized such as the direct application of cold air for the cooling medium, and electrical resistance units for the heating means. In other words, the gist of the invention lies in the successive alternate heating and cooling to create a truly homogeneous surface layer on a pool of molten glass, and in the positive control over and uniform feeding forward of the thus treated glass toward the line of draw by such means as the drum 42.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of producing sheet glass, consisting in alternately heating and cooling the surface of a mass of molten glass to create a floating unit of plastic glass on a body of molten glass, and then drawing the floating unit off in sheet form.

2. The process of producing sheet glass, consisting in alternately heating and cooling the surface of a mass of molten glass to produce a plastic homogeneous skin, the thickness of which is controlled by the relative cooling action, and then drawing a sheet of glass from the plastic skin thus formed.

3. The method of producing sheet glass, consisting in congealing a layer or sheet of semi-solid glass on the surface of a pool of molten glass, by alternately heating and cooling the same, floating this sheet of glass horizontally on the fluid glass beneath, drawing the sheet away from the pool, and treating the surfaces thereof to give the desired finish.

4. The method of producing sheet glass, consisting in congealing a layer or sheet of semi-plastic glass on the surface of a pool of molten glass, by alternately heating and cooling the same, floating this sheet of glass horizontally on the fluid glass beneath, drawing the sheet away from the pool, and then applying a flame to the surface of the sheet to fire polish the same.

5. The process of producing sheet glass, consisting in progressively forming a layer or sheet of semi-solid glass on the surface of a pool of molten glass by alternately heating and cooling the same, and then progressively drawing the said sheet away from the pool.

6. The process of producing sheet glass which consists in progressively changing the surface layer on a body of molten glass from its molten state to a plastic condition by alternately heating and cooling the same until a uniform homogeneous skin is formed, and continuously removing the plastic surface skin as a sheet of glass from the molten body.

7. The process of producing sheet glass which consists in the formation of a semi-solid sheet of glass within the environs of the melting tank and upon the surface of a body of molten glass therein by alternatively and successively heating and cooling, and then producing a sheet of glass from the sheet in the melting tank by communicating drawing stress thereto.

8. In an apparatus for producing sheet glass, the combination of means for progressively causing the formation of a sheet of plastic glass upon the surface of a molten glass by alternate heating and cooling, and means for drawing off the sheet of plastic glass in sheet form.

9. In an apparatus for producing sheet glass, in combination of means for heating the surface of the pool of molten glass, means for cooling the same, said heating and cooling means being arranged in relation that the surface of the molten glass will be alternately heated and cooled to form a semi-solid skin on the surface of the pool, and means for removing this skin from the pool in sheet form.

10. In an apparatus for producing sheet glass, in combination of means for successively and alternately heating and cooling the surface of the pool of molten glass to form a semi-solid skin, and means for drawing the skin from the pool in sheet form and in a horizontal plane.

11. In an apparatus for producing sheet glass, in combination of means for successively and alternately heating and cooling the surface of a pool of molten glass to create a skin, means to withdraw the skin from the pool in sheet form, and means for fire polishing the sheet as it leaves the pool.

12. In sheet glass apparatus, in combination of means for successively and alternately heating and cooling the surface of a pool of molten glass to form a semi-solid skin, and means to lift the skin and draw it off in sheet form.

13. In sheet glass apparatus, in combination of means for successively and alternately heating and cooling the surface of a pool of molten glass to form a skin, and means for mechanically advancing the skin to the point of draw where it is drawn away in sheet form.

14. In sheet glass apparatus, in combination of means for forming a semi-solid layer on a source of molten glass, means for mechanically advancing the layer to the point of draw, and means to lift the skin and draw it off in sheet form.

Signed at Toledo, in the county of Lucas, and State of Ohio, this 24th day of December, 1924.

ENOCH T. FERNGREN.